United States Patent

Feldman et al.

[15] 3,675,025

[45] July 4, 1972

[54] ELECTROMAGNETICALLY SENSITIVE DEVICE AND CHARGE STORAGE METHOD OF OPERATION

[72] Inventors: Martin Feldman, Springfield; George Ludwig Heiter, Berkeley Heights, both of N.J.

[73] Assignee: Bell Telephone Laboratories, Incorporated, Murray Hill, N.J.

[22] Filed: June 16, 1970

[21] Appl. No.: 46,646

[52] U.S. Cl. ....................250/211 J, 250/220 M, 317/235 N

[51] Int. Cl. ..........................................................H01j 39/12

[58] Field of Search ....................250/211 R, 211 J, 212, 199, 250/219 D, 220 M; 315/311; 317/235 N; 307/238, 311; 340/173 LT, 173 LS; 178/7.2, 7.3

[56] References Cited

UNITED STATES PATENTS

| | | | |
|---|---|---|---|
| 3,439,214 | 4/1969 | Kabell | 250/211 J |
| 3,011,089 | 11/1961 | Reynolds | 250/211 J |

*Primary Examiner*—James W. Lawrence
*Assistant Examiner*—D. C. Nelms
*Attorney*—R. J. Guenther and Arthur J. Torsiglieri

[57] ABSTRACT

Apparatus and method for detecting relatively low intensity electromagnetic energy with high sensitivity comprises a transistor having a light sensitive base area, a current detector-load circuit coupled to its collector terminal, and a voltage control circuit coupled to its emitter terminal. The voltage control circuit serves to supply selective potentials to the emitter terminal in order to enable or inhibit conduction. The current detector-load circuit acts as a low impedance transistor collector load and monitors changes in conduction of the transistor.

15 Claims, 4 Drawing Figures

INVENTORS M. FELDMAN
G. L. HEITER

BY Roland B. Anderson

ATTORNEY

ELECTROMAGNETICALLY SENSITIVE DEVICE AND CHARGE STORAGE METHOD OF OPERATION

BACKGROUND OF THE INVENTION

This invention relates to semiconductor apparatus which receives, stores, and detects relatively low intensity electromagnetic energy with a high degree of sensitivity.

In computers, holographic systems, television cameras, and other related apparatus, a need exists for low intensity electromagnetic energy detectors which have relatively high sensitivity and can be used to detect digital and image signals and/or perform a memory function.

The use of solid state devices, such as diodes and transistors, as photodetectors is well known in the art. Photoenergy incident on the base area of a forward biased phototransistor gives rise to a base current which in turn produces a collector current indicative of the input light. One basic problem associated with this technique of light detection is the relative insensitivity to low intensity light energy due to the presence of noise which may be confused with signal, and insufficient charge accumulation to forward bias the base-emitter junction. One solution has been to operate a P-N diode in the "-storage mode"; this involves reverse biasing the diode and then applying to it a light signal which is to be detected. The applied light signal lessens the reverse biasing condition. The amount of current necessary to restore the diode to its original reverse biased state is approximately proportional to the total amount of light received by the diode. The storage mode of operation of a diode has been adapted to the phototransistor in the invention by G. W. Weckler on which U.S. Pat. No. 3,427,461 has been granted.

In the Weckler invention, radiant light energy incident upon the base of a phototransistor, whose collector-base and base-emitter junctions are reverse biased, serves to lessen the reverse bias on the capacitance associated with the collector-base junction. The collector-base capacitance must be much greater than the base-emitter capacitance in order to achieve the storage mode of operation described. It is difficult to fabricate a phototransistor with an extremely low base-emitter junction capacitance and therefore the collector-base junction capacitance must be appreciable if one seeks to practice Weckler's invention. For this and other reasons that will become clear hereafter the Weckler device is not as sensitive as would be desired.

Applicants' invention seeks to increase both detection sensitivity and speed of operation.

OBJECTS OF THE INVENTION

It is an object of this invention to detect relatively low intensity electromagnetic energy signals with a high degree of sensitivity and greater speed than prior art invention.

It is another object of this invention to provide a detector array with higher sensitivity and greater speed than conventional detector arrays for use in a holographic memory system.

It is a further object of this invention to provide optical storage apparatus that may be used as part of a more sensitive television camera than presently exists in the art.

SUMMARY OF THE INVENTION

These and other objects of the invention are attained in an illustrative embodiment thereof comprising a phototransistor containing a current detector-load circuit connected to the collector terminal and a voltage control circuit connected to the emitter terminal.

This invention allows relatively low intensity light energy to be detected with a high degree of sensitivity by storing the energy received from the light signal in the capacitances associated with the collector-base ($C_{CB}$) and base-emitter ($C_{BE}$) junctions of a phototransistor over a period of time and then, at a desired time, reading out the information by allowing the stored charge to discharge very rapidly into the base-emitter junction, giving rise to a relatively large spike of collector current which lasts a relatively short period of time. It is therefore possible by the use of this invention to detect with a high degree of sensitivity much lower intensity light signals than could be detected using normal methods, including the conventional storage-mode method. The term light is meant to include such electromagnetic frequencies as may be outside the range of detection by the human eye.

The current detector-load circuit acts as a low impedance collector-load resistance, and current detector, and supplies approximately constant potential to the collector terminal at all times.

The voltage control circuit applies the proper potentials to the emitter terminal of an n-p-n phototransistor in order to substantially forward bias its base-emitter junction during the biasing cycle and the readout cycle, and to substantially inhibit conduction during the time light signal energy is received and stored in capacitances $C_{CB}$ and $C_{BE}$.

During the biasing cycle, bias light energy is applied to the light sensitive base area of the phototransistor, and ground potential is applied to the emitter terminal by the voltage control circuit. This substantially forward biases the base-emitter junction of the phototransistor and allows collector current to flow. A steady state condition is first established and then the emitter terminal potential is is raised to a positive potential so as to inhibit substantially all conduction in the phototransistor. Simultaneously, the biasing light is turned off. At this point in time, the collector-base and the base-emitter junctions are so biased as to constitute relatively high impedance paths to charge stored in $C_{CB}$ and $C_{BE}$.

Signal light energy is now transmitted to the light sensitive base area thus increasing the base's potential since the charge it creates, like the charge created by the bias light energy is stored in the capacitances $C_{CB}$ and $C_{BE}$ because it has no low impedance path to discharge through.

After the termination of the exposure of the base area to the signal light energy, the emitter terminal potential is decreased to a slightly negative potential. This causes the base-emitter junction initially to have a greater forward bias than it had during the biasing cycle and allows a relatively rapid discharge of stored charge on capacitances $C_{CB}$ and $C_{BE}$ and, therefore, a correspondingly relatively large amplitude output current spike which decays rapidly due to the low effective time constant associated with the forward biased base-emitter junction. This transient spike of collector current is the output signal which is detected by the current detector-load circuit.

A new biasing cycle can be initiated after the output current spike transient has essentially terminated. Since the current spike decays relatively rapidly the inherent system speed is relatively high.

In another embodiment of the invention the voltage control circuit can be so constructed that it can be activated into the required states by a light source which emits light that may be outside the detection range of the human eye. This feature makes the invention useful as a target in a solid state television camera as described in applicant's assignee's copending application of E. F. Labuda Ser. No. 755,990, now abandoned filed Aug. 28, 1968.

Still another embodiment of the invention is a plurality of individual phototransistors arranged in a memory array of M rows and N columns used to detect relatively low intensity light signals with a relatively high degree of sensitivity. The collector of each phototransistor in a common column is electrically connected to all others in the same column. The emitter of each of the phototransistors in a common row is electrically connected to each other emitter in its row. The emitter lines are coupled to voltage control circuits and the collected lines are coupled to current detector-load circuits.

The basic operation of this array is similar to that used to receive, store, and detect light energy signals described for a single phototransistor. One difference occurs after the biasing cycle and the storing of the light signal energy has been accomplished. At this time, all the emitter terminals are held at a positive potential. One selected row of emitters is lowered in potential so as to permit the signals stored on the phototransistors corresponding to these emitters to be detected. After interrogation of this row is completed, its potential is raised back to the original positive potential and the potential of some other row of emitters is lowered until the signal energy stored on its phototransistors has been detected. This process is repeated until all desired rows of photodetectors have been interrogated. A new biasing cycle can now be initiated and new light signal can be inserted into the array.

Yet another embodiment of the invention is a holographic memory system comprising a laser, a hologram on which information has been recorded, and a detector array as described above.

The light output from the laser is directed upon the hologram which contains prerecorded digital or image information, which is transmitted from the hologram in the form of light energy, when the hologram is illuminated by the laser light. The transmitted light energy is received and stored over a period of time by the individual phototransistors of the detector array. When desired, the stored light signal energy can be detected by using the steps indicated previously.

DETAILED DESCRIPTION OF THE DRAWING

Figure 1:
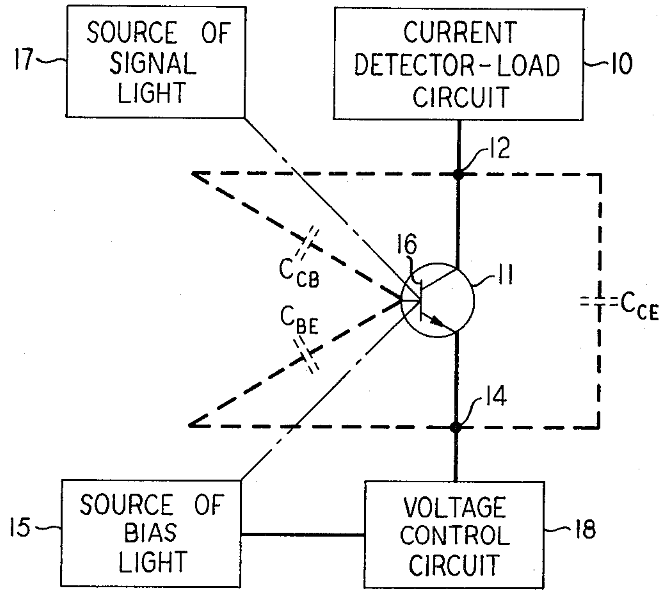
FIG. 1 is an illustration of a transistor embodiment of the invention.

FIG. 1 shows a phototransistor 11, containing a collector terminal 12, an emitter terminal 14, and a light sensitive electrically isolated base area 16. A current detector-load circuit 10 which is connected to the collector terminal 12 maintains an approximately constant potential at the collector terminal at all times. A source of bias light 15 is coupled to a voltage control circuit 18 and the timing of the application of biasing light and the potential applied to the emitter terminal 14 by the voltage control circuit are thus synchronized. A source of signal light 17 is applied to the light sensitive base 16 of the phototransistor 11. The capacitances $C_{CB}$, $C_{BE}$, and $C_{CE}$ associated with the collector-base junction, the base-emitter junction, and that between collector and emitter, respectively, are shown external to the transistor in order to simplify the description of the mode of operation which appears below.

In the circuit operation, output biasing light from the bias light source 15 is applied to the light sensitive base area 16 of the phototransistor 11 and ground potential is applied by the voltage control circuit 18 to the emitter terminal 14. As bias light energy is received by the base area, the base potential rises to some positive value which substantially forward-biases the base-emitter junction and thereby allows collector current to flow. The time lag until steady state conduction is reached upon the application of bias light to the base area of the phototransistor is partially a function of the intensity of the applied bias light. Hence, high speed operation can be achieved by using high intensity bias light.

The biasing cycle serves to erase all prior information that may have been stored in the transistor. It also serves to raise the base to a potential which is a function of the intensity of the applied bias light.

At this point in time, or at some useful time thereafter, the voltage control circuit raises the voltage applied to the emitter terminal from ground potential to a positive potential, and thereby reduces the forward bias across the base-emitter junction so as to inhibit substantially all collector current flow.

The change of potential at the emitter terminal causes the base-emitter junction to appear as a relatively high impedance path to any charge stored on capacitances $C_{CB}$ and $C_{BE}$. The base-collector junction will also constitute a relatively high impedance path to any charge stored on capacitances $C_{CB}$ and $C_{BE}$. Charge created by bias light energy stored during the biasing cycle has no low impedance path to discharge through and therefore is effectively trapped in capacitances $C_{CB}$ and $C_{BE}$.

At this point in time or some useful time thereafter, a source of signal light energy is applied to the light sensitive base area 16 for a selected period of time. Photoenergy received by the base from the signal light source is stored in the form of charge in capacitances $C_{CB}$ and $C_{BE}$. The signal created charge like the stored charge created by the bias light energy, has no low impedance path to discharge through and therefore is effectively trapped in capacitances $C_{CB}$ and $C_{BE}$. The incident light energy received by the base area increases the base potential by an amount which is a function of the light energy received.

At the end of the exposure time of the light sensitive base area to the signal light, or at some useful time thereafter, the voltage control circuit lowers the potential applied to the emitter terminal to a slightly negative potential. As the result of the change in the emitter potential (to a potential which is slightly below what it was during the biasing cycle,) and the increase in base potential due to the stored signal energy, the base-emitter junction has a greater forward-bias potential than it had during the biasing cycle. With no light signal present during the signal exposure time, the base-emitter junction would still have a greater forward-bias than it had during the bias cycle but not as great as if there had had been an applied light signal.

It is desirable to have a greater forward-bias on the base-emitter junction during the readout cycle than during the bias cycle in order to achieve higher sensitivity by obtaining a greater difference between the maximum amplitude of the output signal which indicates the presence of an input light signal and one that does not.

The characteristics of a forward-biased base-emitter junction of a transistor are such that within a certain range of values of forward-bias potential, the collector current increases approximately exponentially with a linear increase in the forward-bias potential. In order to obtain relatively high sensitivity, it is desirable to operate this transistor at a reasonably high level of forward-bias potential across its emitter-base junction in order to take maximum advantage of this transistor characteristic.

The change in the base potential due to the incident light signal is approximately proportional to the charge Q stored and approximately inversely proportional to the sum of capacitances $C_{CB}$ and $C_{BE}$.

It is well known in the art that the relationship between a change in voltage, $\Delta V$, on a capacitor terminal, its capacitance $C$, and the amount of charge, $Q$, received by it are governed by the equation: $Q = C\,\Delta V$ and therefore, $\Delta V = Q/C$. It is therefore apparent that if a given amount of charge ($Q$) is deposited on the terminal of a capacitor ($C$), the smaller the value of the capacitor ($C$), the larger the corresponding change in potential ($\Delta V$). In order to maximize this change in potential on the base it is necessary that $C_{CB}$ and $C_{BE}$ be as small as practically possible. This will effectively increase the ratio of the maximum amplitude of the output signal current spike when there has been a light signal present as compared to when no light signal is present and result in relatively high detection sensitivity. It will likewise result in high detection sensitivity to varying intensity light signals which would be the input signals in a linear system such as a television camera.

Another advantage that is achieved due to the operation of the base-emitter junction at a greater forward-bias potential during the readout cycle than during the bias cycle is faster operation. Generally the effective time constant associated with a forward-biased base-emitter junction decreases as the forward-bias potential increases. This allows any charge stored on capacitances $C_{CB}$ and $C_{BE}$ to discharge very rapidly into the base-emitter junction which results in a relatively large output current spike which decays relatively rapidly. This rapid decay allows a new biasing cycle to be initiated relatively soon after the maximum height of the current spike has been reached. By minimizing the values of $C_{CB}$ and $C_{BE}$ we further reduce the amount of time necessary to discharge them and correspondingly increase the height of the output current spike and decrease its duration.

The operation of the transistor during the readout cycle at relatively high collector currents ensures that more uniform current gain characteristics will be achieved among different transistors of the same type. There is a relatively wide variation in current gain among transistors of the same type operating at relatively low collector currents. This variation is reduced by operating at reasonably high collector currents. The difference in current gain among different transistors being used together to detect an image is of particular concern in television camera operations. Applicants' invention seeks to minimize this area of concern.

One simple example of a configuration that will act as a current detector-load circuit is a load resistor with one end connected to a positive potential and the other end connected to the collector terminal 12 of transistor 11. A sensitive voltage meter or oscilloscope is then connected to the transistor collector terminal and the current through the load resistor can easily be monitored as a function of the voltage variations across the resistor.

Another method of detecting conduction is to connect the set input of an R-S flip-flop to the common junction between the load resistor and the collector terminal. The change in conduction in the transistor corresponding to the receipt of signal light energy will cause a voltage spike to appear at the collector terminal of the transistor and therefore at the set input of the flip-flop which will cause the flip-flop's output to change from a normally low state to a high state. This change in the state of the flip-flop will denote the receipt of signal light energy on the base area of the transistor. The flip-flop will remain in this high state and will not respond to further voltage changes in its set input. At some desired time the reset input of the flip-flop is then activated to return the flip-flop's output to the normally low state, thereby enabling the flip-flop to respond to a future change in voltage across the collector load resistor corresponding to a change in conduction in the transistor.

A J-K type flip-flop could be substituted for the R-S flip-flop. This type of flip-flop changes states every time there is a spike in voltage across the load resistor corresponding to a change in conduction in the transistor.

These examples serve merely to demonstrate several ways of sensing and recording the changes in conduction in the transistor and are not meant to be considered the exclusive methods by which this task may be performed. Other more sophisticated schemes are available to those skilled in the art.

A simple example of a voltage control circuit would be a waveform generator whose output levels, pulse duration time, and frequency are variable.

Figure 2:
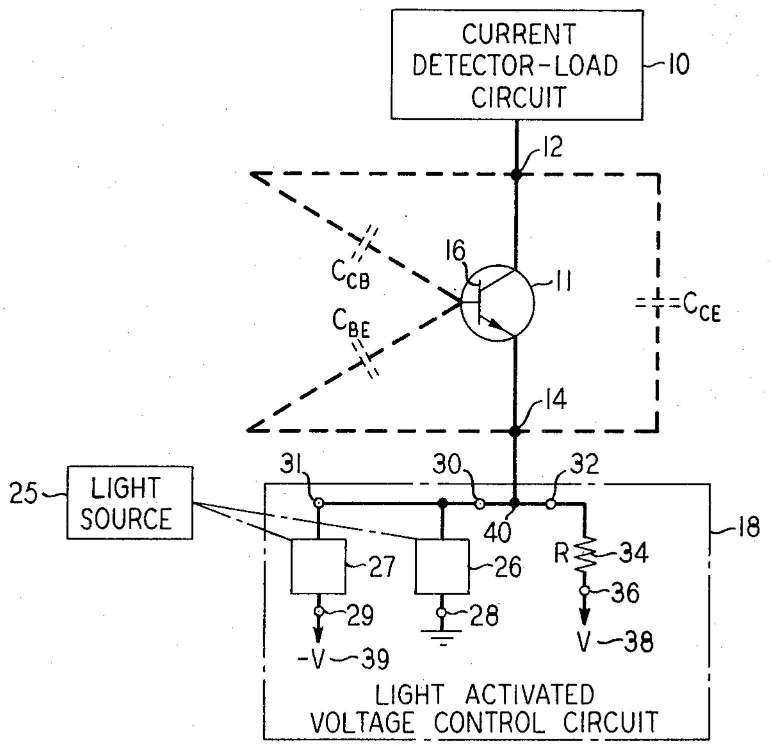
FIG. 2 illustrates the same embodiment of the invention of FIG. 1 except that the voltage control source is adapted to be activated by light energy.

FIG. 2 illustrates one possible embodiment of the voltage control circuit 18 which can be activated by a light source 25. The voltage control circuit 18 is comprised of two photoconductors 26 and 27. Photoconductor 26 is grounded at one terminal 28 and connected by the other terminal 30 to one terminal 32 of a resistor 34 whose second terminal 36 is connected to a positive potential V38. Photoconductor 27 has one terminal 29 connected to a slightly negative potential-V39 and the other terminal 31 is connected to terminal 30. The emitter terminal 14 is connected to the junction 40 of terminals 30, 31, and 32.

When light energy is received on the photoconductor 26 the emitter terminal 14 is effectively grounded and simultaneously bias light is applied to the base area. This, as has been illustrated in the explanation of the embodiment of FIG. 1, effectively forward-biases the emitter-base junction and allows any stored charge or light energy being received on base area 16 to discharge into the base-emitter junction and thereby gives rise to a corresponding collector current. If no light energy is received by the photoconductor 26 and 27 both constitute relatively high impedance paths to the emitter terminal 14, and therefore the emitter terminal is effectively coupled to a positive potential 38 through load resistor 34. For the proper values of the positive potential 38 and the resistor 34, the potential at the emitter terminal 14 is such that the emitter-base junction appears as a relatively high impedance path to any charge stored on capacitances $C_{CB}$ and $C_{BE}$. This emitter potential corresponds to the positive potential applied by the voltage control circuit of FIG. 1 and permits light signal energy to be stored.

Readout is accomplished by applying the output of the light source 25 to photoconductor 27. This effectively connects the emitter terminal 14 to the slightly negative potential –V 39.

This light activated voltage control circuit supplies approximately the same potentials to the emitter terminal 14 of the phototransistor 11 as did the voltage control circuit of FIG. 1. Therefore, the operation of this embodiment is essentially identical to the embodiment described in FIG. 1. This embodiment in integrated array form can be used in television camera applications such as the target of a solid state television camera.

Figure 3:
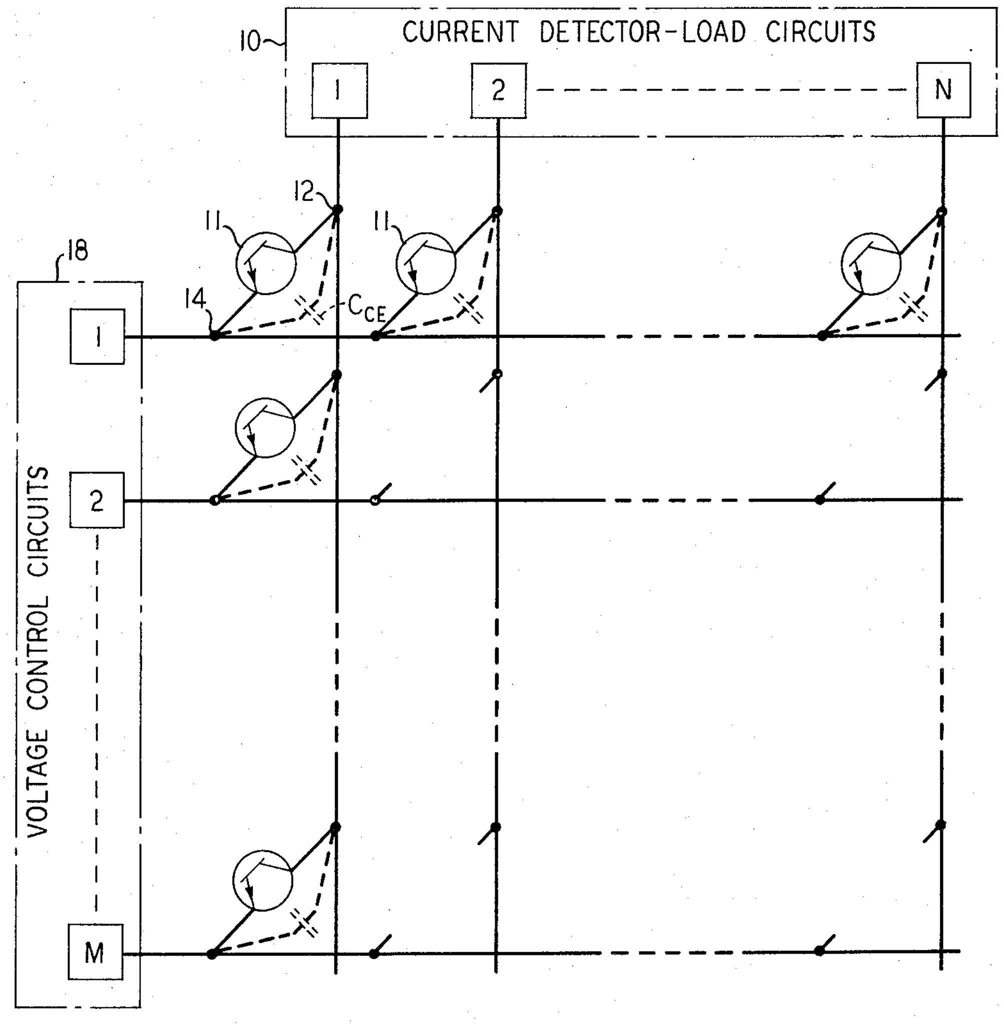
FIG. 3 illustrates another embodiment of the invention wherein a plurality of devices similar to those of FIG. 1 are interconnected.

FIG. 3 illustrates an array of photodetectors 11 which performs a memory function. The array is arranged in M rows and N columns of individual phototransistors which are interconnected. Each of the collectors of the phototransistors in a given column and each of the emitters of the phototransistors in a given row are electrically connected. Current detector-load circuits 10 are coupled to the collector lines and voltage control circuits 18 are coupled to the emitter lines. The operation of this memory is similar to that of the single transistor 11 of FIG. 1.

During the biasing cycle the voltage control circuits apply ground potential to all the emitter terminals of the phototransistors. Simultaneously bias light energy is applied to all phototransistors and a steady state conduction condition is achieved. All voltage control circuits then apply a positive potential to all emitter terminals and the bias light energy is turned off. Conduction is then substantially inhibited and signal light energy is then received on some phototransistor base areas for a selected period of time. Low intensity signal light energy is received for a longer period of time than a higher intensity signal in order to achieve the same degree of sensitivity.

At some useful time after the exposure of the base areas to the signal light energy one of the control circuits applies a slightly negative potential to its row of emitters while all other emitter rows are held at the positive potential. This forward-biases the base-emitter junctions of the selected row of phototransistors and allows any signal energy stored therein to be detected. This emitter row is then returned to the positive potential and the next selected row is interrogated by the same sequence until all desired rows have been interrogated.

One undesirable factor associated with this embodiment is the parasitic capacitance $C_{CE}$ associated with each phototransistor in the array. These capacitors a.c. couple the potential changes produced by the voltage control circuit on the interrogated emitter line onto all collector lines and therefore into all the current detector-load circuits. As the emitter potential of a selected row of transistors is lowered to slightly below ground potential, each of the other rows of emitters of the remaining phototransistors are raised in potential by an amount equal to the amplitude of the change in potential of the selected row, divided by the number of rows. This serves to effectively cancel out this undesirable capacitive coupling effect.

The configuration of FIG. 3 can be used as a 64 word by 64 bit read only optical memory which contains 64 columns and 64 rows of individual interconnected phototransistors. This makes a total of 4,096 phototransistors.

It is difficult with today's integrated circuit technology to fabricate 4,096 good phototransistors on a single silicon substrate. One solution to this problem is to fabricate 64 individual integrated circuit chips, each containing an 8 ×8 array, and pack and interconnect them on a single substrate to form the 64 ×64 memory array.

Figure 4:
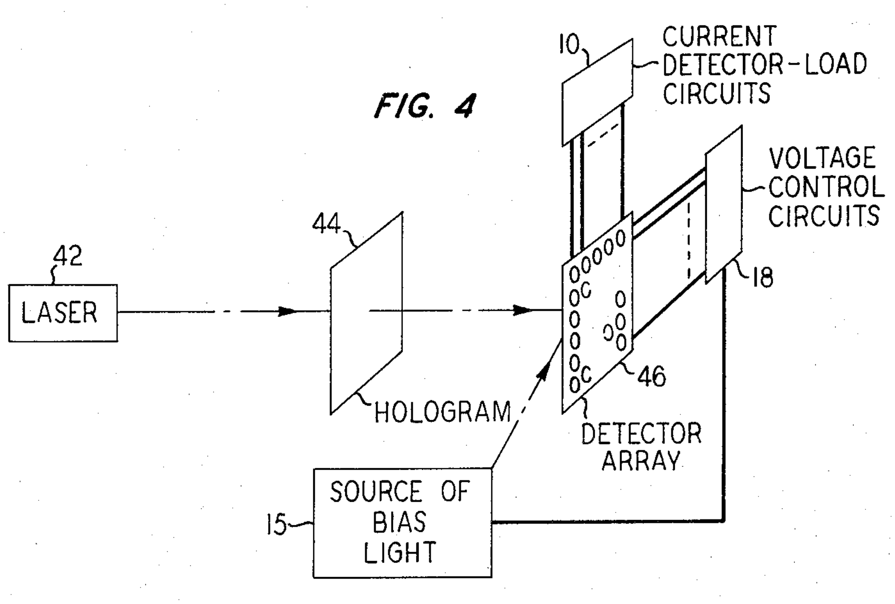
FIG. 4 is a schematic view of another embodiment of the invention wherein the embodiment of FIG. 3 is used as part of a holographic memory system.

FIG. 4 illustrates another embodiment of the invention comprising a laser 42, a hologram 44 on which information has been recorded, and a detector array 46 which form a holographic memory system. The circuit of FIG. 3 is used as the detector array.

It is known that when an object is illuminated it modulates the illuminating beam so as to form a beam of light that carries information representative of the object. If the light is coherent, a record, called a hologram, can be made of the phase and amplitude of this information-bearing beam by interfering on a recording medium, such as a photographic plate, the wave fronts of the information beam and a phase-related beam. Proper illumination of the hologram reconstructs therefrom the stored information-bearing beam and therefore an image of the stored object.

Various techniques exist for storing digital information on a hologram. An article entitled "Hologram Memory for Storing Digital Information" at page 1,581 of the IBM Technical Disclosure Bulletin, Volume 8, No. 11 (April, 1966), describes a method for using holograms in a high capacity digital memory.

Light energy from a source such as a laser 42 is directed upon a hologram 44 which contains stored digital information which is transmitted from the hologram when it is illuminated by the incident laser light. This transmitted signal light energy is received by the detector array and stored. If digital information is stored in the hologram each individual photodetector receives only one bit of digital information from the hologram at a time. When desired, this information can be extracted from the detector array from the steps outlined in the operation of the memory array of FIG. 3.

The embodiments described are intended to be illustrative of the principles of the invention. Various other modifications and embodiments may be made by those skilled in the art without departing from the spirit and scope of the invention.

We claim:

1. A method for detecting relatively low intensity signal light energy with relatively high sensitivity and speed comprising the sequence of steps of:

applying a first forward-bias potential to the base-emitter junction of a transistor which comprises a collector, an emitter, a light sensitive base area, a base-emitter first junction, a collector-base second junction, a capacitance $C_{BE}$ associated with said first junction, and a capacitance $C_{CB}$ associated with said second junction;

applying bias light energy to said first junction while it has said first forward-bias potential applied to it;

allowing a sufficient time to elapse until steady state conduction occurs and then reducing said first forward-bias potential across said first junction and cutting off said bias light energy, whereby substantially all conduction is inhibited;

applying the signal light energy to said light sensitive base area for a period of time while no bias light energy is being applied;

storing said received signal light energy in said capacitances $C_{CB}$ and $C_{BE}$ of said transistor, whereby the potential of said base is increased approximately proportional to the amount of signal light energy received and approximately inversely proportional to the sum of said capacitances $C_{CB}$ and $C_{BE}$;

reading out the stored signal information comprising the step of applying a second forward-bias potential to said first junction in the absence of bias light energy, said second forward-bias having greater absolute magnitude than said first forward-bias potential, whereby said energy stored in said capacitances $C_{CB}$ and $C_{BE}$ rapidly discharges into said first junction, thereby giving rise to a relatively large spike of collector current that has a relatively short duration and serves as the output signal; and detecting said relatively large spike of collector current.

2. The method of claim 1 further comprising the step of semipermanently recording the change in conduction in said transistor.

3. Semiconductor detector and memory apparatus comprising:

a source of bias light;

a source of signal light;

a plurality of innerconnected rows and columns of junction transistors;

each of said transistors comprising a light sensitive base area, a capacitance $C_{BE}$ associated with the base-emitter junction, and a capacitance $C_{CB}$ associated with the collector-base junction;

a first means for applying a first forward-bias potential to all of said base-emitter junctions of said transistors while bias light is incident upon the light sensitive base areas, whereby energy from said bias light incident on said light sensitive base areas discharges into said base-emitter junctions, thereby allowing steady state conduction in said transistors;

a second means coupled to said transistors for inhibiting substantially all conduction in said transistors, thereby allowing energy from signal light incident upon the photosensitive base areas of selected transistors to be stored in the capacitances $C_{BE}$ and $C_{CB}$ associated with said selected transistors; and a third means coupled to said transistors for applying a second forward-bias potential to the base-emitter junctions of the transistors of a selected row in the absence of bias light, said second forward-bias potential having a greater magnitude than said first forward-bias potential such that energy stored in the capacitances $C_{CB}$ and $C_{BE}$ of the transistors of the selected row discharges rapidly into the base-emitter junctions, thereby giving rise to conduction in the transistors of the selected row which serves as the output signals.

4. The apparatus of claim 3 further comprising a fourth means for detecting changes in conduction in said transistors.

5. The apparatus of claim 4 wherein said fourth means is current detector-load circuits.

6. The apparatus of claim 5 wherein voltage control circuits comprise said first, second, and third means.

7. The apparatus of claim 6 wherein the voltage control circuits are coupled to the emitters of the transistors.

8. The apparatus of claim 6 wherein the voltage control circuits are adapted to be activated by external sources of light.

9. The apparatus of claim 6 wherein each of the collectors of the transistors in a given column and each of the emitters of the transistors in a given row are coupled together.

10. The apparatus of claim 9 wherein the current detector-load circuits are coupled to each of said columns and the voltage control circuits are coupled to each of said rows.

11. The apparatus of claim 3 wherein the two junction capacitances associated with each of said transistors are approximately equal.

12. The apparatus of claim 3 wherein the source of signal light energy comprises a hologram activated by a laser.

13. A semiconductor detector and memory cell comprising:

a source of bias light;

a source of signal light;

a transistor comprising a collector, an emitter, a light sensitive base area, a base-emitter first junction, a capacitance $C_{BE}$ associated with said first junction, a collector-base second junction, and a capacitance $C_{CB}$ associated with said second junction;

a first means for applying a first forward-bias potential to said first junction while said bias light is incident upon the light sensitive base area, whereby the energy from said bias light incident upon said light sensitive base area discharges into said first junction, thereby allowing steady state conduction in said transistor;

a second means for inhibiting substantially all conduction in said transistor, thereby allowing the energy from signal light incident upon said photosensitive base area to be stored in said capacitances $C_{BE}$ and $C_{CB}$; and a third means coupled to said transistor for applying a second forward-bias potential to said base-emitter junction in the absence of said bias light, said second forward-bias potential having a greater magnitude than said first forward-bias potential such that energy stored in capacitances $C_{CB}$ and $C_{BE}$ discharges rapidly into the base-emitter junction, thereby giving rise to conduction in said transistor which serves as the output signal.

14. Semiconductor detector and memory apparatus comprising:

a plurality of innerconnected rows and columns of junction transistors;

each of the bases of said transistors having an area which is adapted to received signal and bias light;

each of said transistors being capable of storing the energy from a signal light incident upon the base areas in the parasitic capacitances associated with the two junctions of each transistor;

each of said transistors being capable of conduction when bias light is incident upon the base areas;

a first means for applying a forward-bias potential to the base-emitter junctions of said transistors while bias light is incident upon the base areas, whereby the energy from bias light incident upon the base areas discharges into the base-emitter junctions, thereby allowing steady state conduction in said transistors;

a second means coupled to said transistors for inhibiting substantially all conduction in said transistors, thereby allowing the energy from signal light incident upon the base areas of selected transistors to be stored in the junction capacitances associated with the selected transistors; and a third means coupled to said transistors for applying a second forward-bias potential to the base-emitter junctions of the transistors of a selected row in the absence of bias light, said second forward-bias potential having a greater magnitude than said first forward-bias potential such that energy stored in the parasitic capacitances associated with the two junctions of the transistors of the selected row discharges rapidly into the base-emitter junctions, thereby giving rise to conduction in the transistors of the selected row which serves as the output signals.

15. A semiconductor detector and memory cell comprising:

a junction transistor comprising a base area adapted to receive signal and bias light;

said transistor being capable of storing the energy from signal light incident upon the base area in the parasitic capacitances associated with the two junctions of the transistor;

said transistor being capable of conduction when bias light is incident upon the base area;

a first means for applying a first forward-bias potential to the base-emitter junction while bias light is incident upon the base area, whereby the energy from said bias light incident upon the base area discharges into the base-emitter junction, thereby allowing steady state conduction in said transistor;

a second means for inhibiting substantially all conduction in said transistor, thereby allowing the energy from signal light incident upon the base area to be stored in the parasitic capacitances associated with the two junctions; and a third means coupled to said transistor for applying a second forward-bias potential to the base-emitter junction in the absence of bias light, said second forward-bias potential having a greater magnitude than said first forward-bias potential such that energy stored in the two parasitic capacitances associated with the two junctions discharges rapidly into the base-emitter junctions, thereby giving rise to conduction in said transistor which serves as the output signal.

* * * * *

UNITED STATES PATENT OFFICE
CERTIFICATE OF CORRECTION

Patent No. 3,675,025 Dated July 4, 1972

Inventor(s) Martin Feldman and George L. Heiter

It is certified that error appears in the above-identified patent and that said Letters Patent are hereby corrected as shown below:

In the specification, column 2, line 23, after "is" delete "is"; line 68, delete "collected" and insert --collector--. Column 3, line 43, after "of" delete "bias" and insert --biasing--.

In claim 14, column 9, line 13, after "apparatus" insert --for use with a signal light and bias light source--. Claim 15, column 10, line 9, after "cell" insert --for use with a signal light and bias light source--.

Signed and sealed this 19th day of December 1972.

(SEAL)
Attest:

EDWARD M.FLETCHER,JR.
Attesting Officer

ROBERT GOTTSCHALK
Commissioner of Patents